Jesse H. Harlan & Thos. Pomeroy, Improved
GLOVE CUTTER.

No. 72197

PATENTED DEC 17 1867

Witnesses.
Sam'l S. Boyd
Joseph Dickson

Inventor:
Jesse H. Harlan
Thos. Pomeroy
per
Boyd & Co Att'ys

United States Patent Office.

JESSE H. HARLAN AND THOMAS POMEROY, OF DENVER CITY, COLORADO, ASSIGNORS TO THEMSELVES AND WILLIAM H. HARLAN.

Letters Patent No. 72,197, dated December 17, 1867.

---

IMPROVEMENT IN MACHINES FOR CUTTING OUT GLOVES.

---

*The Schedule referred to in these Letters Patent and making part of the same.*

---

TO ALL WHOM IT MAY CONCERN:

Be it known that we, JESSE H. HARLAN and THOMAS POMEROY, of Denver City, Arapahoe county, Territory of Colorado, have invented a new and useful Improved Glove-Cutter, of which the following is a full, clear, and exact description, reference being had to the annexed drawing, making a part of this specification, in which—

Similar letters indicate like parts.

The object of our invention is to produce a glove-cutter, by which the whole glove may be cut at once from one piece of material, and which may be readily adjusted so as to cut gloves of different size.

Figure 1:
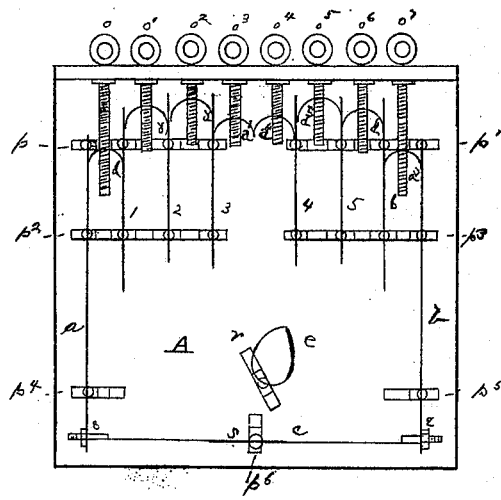
Figure 1 represents a bottom view of our invention.
Figure 2:
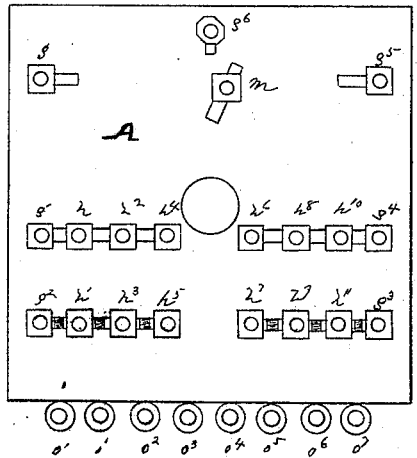
Figure 2 represents a top view of same.

It consists of a platen, A, figs. 1 and 2, to the under side of which, as seen in fig. 1, are fixed two parallel knives, $a$ and $b$, and a third knife, $c$, at right angles to them, and attached to them at its extremities, the knives $a$ and $b$ being the length of the largest-sized glove, and the knife $c$ twice the width of such glove. Between the knives $a$ and $b$, and parallel with them, are arranged six knives, 1, 2, 3, 4, 5, 6, their length being equal to that of the respective fingers of the largest-sized glove, the little finger being represented by 1 and 6; the distance between $a$ and 1, 1 and 2, 2 and 3, 4 and 5, 5 and 6, 6 and $b$, being equal to the width of a finger of the largest-sized glove, while the distance between 3 and 4 is twice that width. Between these knives, at their extremities, are fixed circular knives $d$ $d^1$ $d^2$ $d^3$ $d^4$ $d^5$ $d^6$ $d^7$, at a distance from the base of the knives 1, 2, 3, 4, 5, 6, corresponding to the length of the fingers of the largest-sized glove. An oval knife, $e$, is placed in the position where the thumb of the glove would fall. The knives $a$, $b$, and $c$ are held in position by bolts, which, passing through the platen, are fastened by the nuts $g$ $g^1$ $g^2$ $g^3$ $g^4$ $g^5$ $g^6$, while the knives 1, 2, 3, 4, 5, 6, are attached to bolts which are fastened in the same manner by the nuts $h$ $h^1$ $h^2$ $h^3$ $h^4$ $h^5$ $h^6$ $h^7$ $h^8$ $h^9$ $h^{10}$ $h^{11}$. The oval knife $e$ likewise has a bolt secured by a nut, $m$, all of which are shown in fig. 2. The circular knives move upon screws, $o$ $o^1$ $o^2$ $o^3$ $o^4$ $o^5$ $o^6$ $o^7$, figs. 1 and 2, passing through a projection in the under side of the platen.

The platen being attached to a follower worked by screw, lever, or any other desired power, the bolts being fastened, and the leather from which the glove is to be cut placed beneath the platen, it is brought down upon it forcibly, and being raised, the leather will be cut in such a manner that when turned upon itself it will form a perfect glove, with the exception of the thumb and forjet. The various bolts of the straight knives slide in straight slots $p$ $p^1$ $p^2$ $p^3$ $p^4$ $p^5$ $p^6$, while that of the oval knife slides in an eccentric slot, $r$, figs. 1 and 2, and the circular knives slide in slots of the straight knives between which they are placed. The knife $c$ is made in two parts, with a double slot, $s$, and its ends slide in the slots $t$ $t'$ of the knives $a$ and $b$.

Now if it be desired to make a glove of a different size, the nuts being loosened, the knives may be readily adjusted as desired, and then, the nuts being tightened, the glove may be cut as before. The thumb and forjets are cut in the ordinary shape by means of instruments constructed in parts with slots, on the principle already described, and may be fixed to the platen so that the complete glove may be cut at once. We claim this construction as our invention.

The advantages of this invention are obvious, since one machine may be made to do the work of several, by reason of being adjustable to gloves of different sizes.

We do not claim to be the first inventors of a machine cutting the whole glove at once; but What we do claim as our invention, and desire to secure by Letters Patent, is—

The adjustable knives of a glove-cutter, when constructed and arranged substantially as shown and specified.

JESSE H. HARLAN,
THOMAS POMEROY.

Witnesses:
ALEXANDER DAVIDSON,
ALEX. W. ATKINS.